United States Patent
Barnes

(10) Patent No.: US 7,631,092 B2
(45) Date of Patent: Dec. 8, 2009

(54) SYSTEM AND METHOD FOR PROVIDING A PLUGGABLE MESSAGE STORE

(75) Inventor: Thomas E Barnes, Whitehouse Station, NJ (US)

(73) Assignee: BEA Systems, Inc., Redwoof Shores, CA (US)

(*) Notice: Subject to any disclaimer, the term of this patent is extended or adjusted under 35 U.S.C. 154(b) by 891 days.

(21) Appl. No.: 10/264,701

(22) Filed: Oct. 3, 2002

(65) Prior Publication Data

US 2003/0110314 A1   Jun. 12, 2003

Related U.S. Application Data

(60) Provisional application No. 60/327,433, filed on Oct. 5, 2001.

(51) Int. Cl.
*G06F 15/16* (2006.01)
*G06F 17/30* (2006.01)

(52) U.S. Cl. .......................... 709/230; 707/10

(58) Field of Classification Search ............... 709/203, 709/227, 207, 103 R, 230; 719/328; 707/10
See application file for complete search history.

(56) References Cited

U.S. PATENT DOCUMENTS

| 5,809,507 | A  | * | 9/1998  | Cavanaugh, III  | 707/103 R |
| 6,021,414 | A  | * | 2/2000  | Fuller          | 707/202   |
| 6,339,782 | B1 | * | 1/2002  | Gerard et al.   | 718/1     |
| 6,643,652 | B2 | * | 11/2003 | Helgeson et al. | 707/10    |
| 6,795,089 | B2 | * | 9/2004  | Rajarajan et al.| 345/629   |
| 6,954,792 | B2 | * | 10/2005 | Kang et al.     | 709/229   |
| 7,117,267 | B2 | * | 10/2006 | Bavadekar       | 709/230   |
| 2003/0009433 | A1 |   | 1/2003 | Murren et al. |           |
| 2003/0110314 | A1 | * | 6/2003 | Barnes         | 709/328   |

* cited by examiner

*Primary Examiner*—George C Neurauter, Jr.
*Assistant Examiner*—Asghar Bilgrami
(74) *Attorney, Agent, or Firm*—Fleisler Meyer LLP

(57) ABSTRACT

An embodiment of the invention provides a pluggable persistent store for use with queuing and messaging servers, such as a JMS server, which can be used to provide reliable messaging. The persistent store is accessed by the messaging server via a standard Application Program Interface (API) or interface that includes asynchronous persistence capability. A lower level pluggable API or interface allows the plugging-in of different persistent mechanisms, that can be used to support different persistence sources, such as file systems and databases. The standard API, combined with an asynchronous persistence capability, together provide a simple, flexible, and high-performance reliable messaging system.

12 Claims, 4 Drawing Sheets

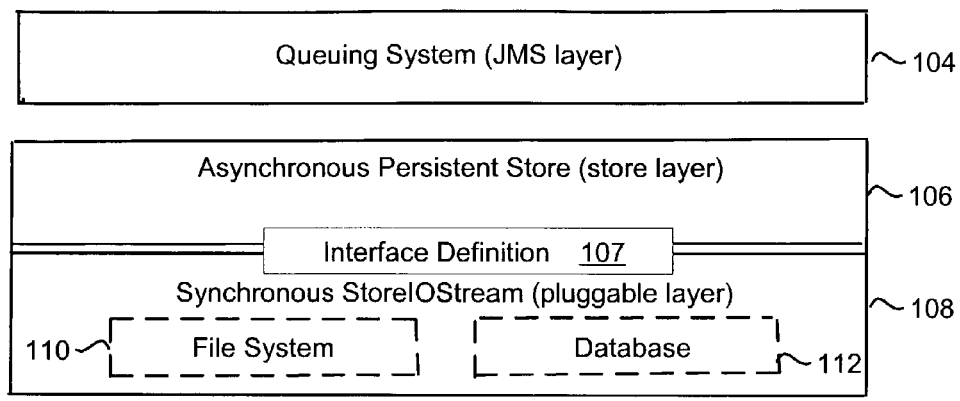

FIGURE 2

| Open | Open the store, recover is called next. | 204 |
|---|---|---|
| Recover | Return a list of all records in the store (used during boot). | 206 |
| Write | Write a record to the store with an associated state number. | 208 |
| ChangeState | Change the state of a record in the store to a new state number. | 210 |
| Delete | Delete a record in the store. | 212 |
| Flush | Persist all previous calls to write, changeState, and delete. | 214 |
| Close | Close the store. | 216 |
| ThrowIOException | Return information about the store suitable for use when an error is detected. | 218 |

FIGURE 3

StoreIOStream API
Defines a persistent store plug-in for the storage manager, and the layer at which file or database input/output is implemented. ~302

Store API
Similar to the "StoreIOStream interface, but allows asynchronicity, and enables the queuing system to send a request to the store ~304

StoreRequest API
Gets the StoreEntry associated with this request. ~306

StoreEntry API
Store an entry for an object stored in the store, and includes the object's state, and an optional 'hidden' stored object. ~308

StoreListener API
Callback for completion of an input/output operation for the given store entry. Returns a NotActiveException if store is closed. ~310

FIGURE 4

SYSTEM AND METHOD FOR PROVIDING A PLUGGABLE MESSAGE STORE

CLAIM OF PRIORITY

This application claims priority from provisional application "SYSTEM AND METHOD FOR PROVIDING A PLUGGABLE MESSAGE STORE" Application No. 60/327,433, filed Oct. 5, 2001 and is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

An embodiment of the invention relates generally to messaging systems for use with transaction and application servers.

BACKGROUND

Messaging and queuing systems are often used to support the passing of messages between different applications, or from one portion of an application to another. These systems usually include the ability to pass messages between different computers on a network, or between a computer and a networked resource, such as a networked database system. They also usually include the ability to support "reliable messaging". Reliable messages are those that are stored persistently when they are sent, such that they continue to exist in the event of a resource failure, for example if the queuing system shuts-down or if there is a network communication failure or a computer failure. When reliable messaging is employed, once the failed resource is available again, the message is recovered from disk and is made available to the intended recipient.

Common reliable messaging systems in use today include those developed in accordance with the Java 2 Enterprise Edition (J2EE), which provides a set of specifications that enable the development of multi-tier enterprise applications. Within the J2EE framework, the Java Messaging Server (JMS) Application Program Interface (API) is used to describe asynchronous communication between the applications. JMS messages are typically asynchronous requests, reports, or events that are passed between enterprise applications. Through the exchange of these messages, each application communicates with other applications and resources, and tracks the progress of the enterprise. JMS thus specifies one common API for enterprise messaging. Other messaging servers and specifications include Tuxedo/Q, MessageQ, IBM's MQSeries, Talco's Rendezvous product, and Progress' Sonic MQ.

One of the problems with current messaging systems is that they lack an efficient way to plug in or otherwise adapt to new persistence resources. This hinders performance and scalability. What is needed is a system that allows for easy expansion to accommodate new resources and resource types, while maintaining a consistent interface for the messaging server, and without placing undue burden on the system.

SUMMARY

And embodiment of the invention introduces the concept of a "pluggable" persistent store that can be used with a variety of messaging systems and servers, including J2EE and JMS. As provided by one embodiment of the invention, the pluggable persistent store is accessed by the messaging server (for example, a JMS server) via a standard application program interface (API) that includes asynchronous persistence capability. In turn, a lower level API exists to allow the plugging-in of different persistent mechanisms. The standard API and asynchronous persistence capability together allow for a simple, flexible, and high-performance reliable messaging, that includes numerous benefits over traditional queuing systems, including the ability to plug-in different persistent mechanisms in a simple fashion.

BRIEF DESCRIPTION OF THE DRAWINGS

FIG. 2 shows a hierarchical illustration of a pluggable store mechanism in accordance with an embodiment of the invention.

FIG. 3 shows a number of API instructions for use with the pluggable store.

FIG. 4 illustrates various interfaces in accordance with an embodiment of the invention.

DETAILED DESCRIPTION

As used herein the following definitions are used:
API—Application Program Interface.
Java—A computer programming language.
J2EE—A set of standards, including APIs, for Java language applications.
WebLogic Server—An application server that conforms to J2EE standards.
JMS—Java Messaging Service. A subset of the J2EE standard that defines a queuing API. It also defines a publish/subscribe API. In this document the word "queuing" is also used to encompass publish/subscribe.
Messaging System/Queuing System—A computer program that facilitates passing messages between applications.

Messaging and queuing systems are often used to support the passing of messages between different applications, or from one portion of an application to another. These systems usually include the ability to pass messages between different computers on a network, or between a computer and a networked resource, such as a networked database system. They also usually include the ability to support "reliable messaging". Reliable messages are those that are stored persistently when they are sent, such that they continue to exist in the event of a resource failure, for example if the queuing system shuts-down or if there is a network communication failure or a computer failure. When reliable messaging is employed, once the failed resource is available again, the message is recovered from disk and is made available to the intended recipient.

An embodiment of the invention introduces the concept of a "pluggable" persistent store. As provided by one embodiment of the invention, the pluggable persistent store is accessed by a messaging system or messaging server (which in one embodiment may be, for example, a JMS server) via a standard interface or API that includes asynchronous persistence capability. A lower level API allows the plugging-in of different persistent mechanisms. Together, the use of a standard API and asynchronous persistence capability allow for a simple, flexible, and high-performance reliable messaging system.

Some of the APIs described herein are designed to ship with or be incorporated into messaging transaction or application server products, such as the WebLogic family of products from BEA Systems, Inc., San Jose, Calif. They may or may not be exposed directly to WebLogic users or to 3rd party add-on applications, although the "pluggable" API is designed with this purpose in mind.

Figure 1:
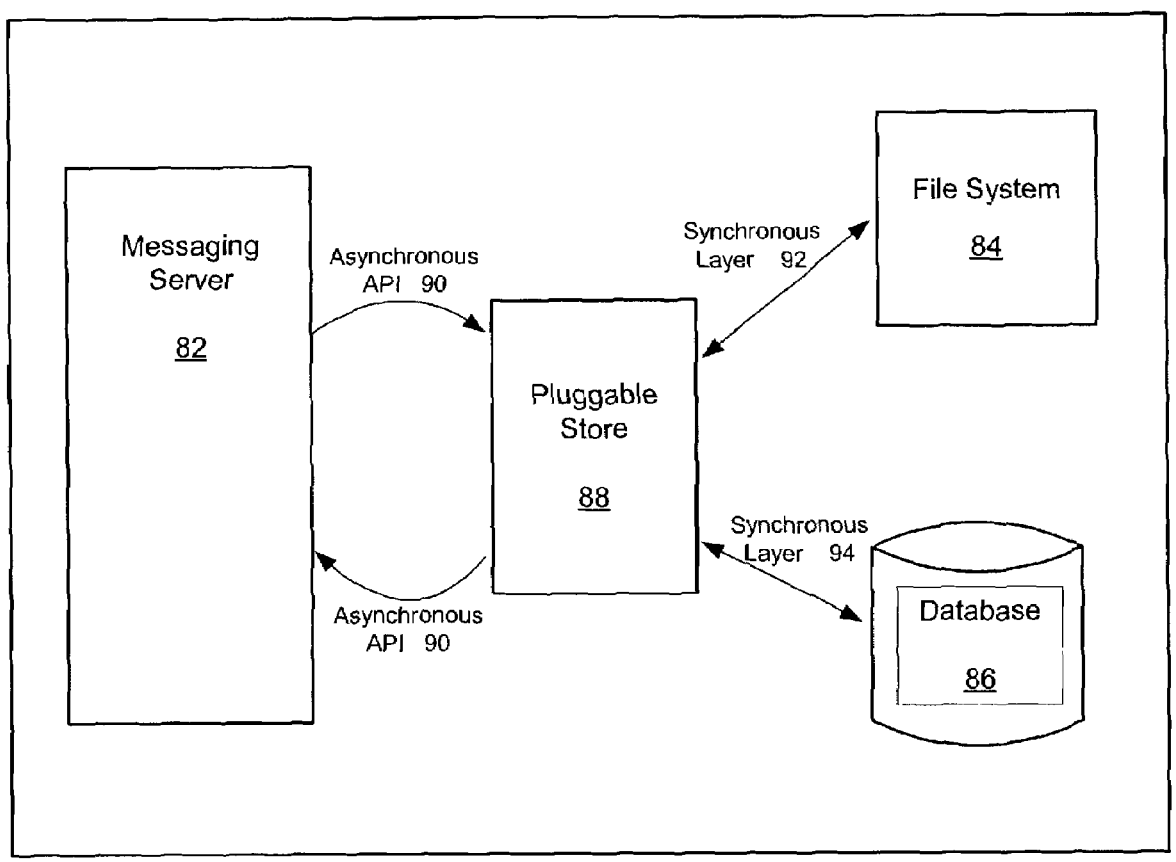
FIG. 1 shows a system in accordance with an embodiment of the invention.

FIG. 1 illustrates a system in accordance with an embodiment of the invention. As shown therein, the system 80 includes a messaging server 82, together with any number of persistent resources, such as a file system 84, and database 86. Only two resources are shown in FIG. 1, although it will be evident that any number or types of resources may be supported. An embodiment of the invention provides a pluggable store 88, for interfacing between the messaging system or messaging server 82 and the resources 84, 86. The pluggable store 88 allows the messaging server to communicate with the resources using an asynchronous API 90. In turn the pluggable store provides a synchronous persistence layer for communicating these messages to the resources. Each resource includes its own plug-in 92, 94 to the synchronous layer within the pluggable store.

FIG. 2 illustrates the architecture of a "pluggable store" in accordance with an embodiment of the invention. The pluggable store shown in FIG. 2 corresponds with the pluggable store 88 shown in FIG. 1. Fundamentally, the "pluggable store" is divided into two layers. The lower layer, otherwise referred to as the stream layer 108, is the "pluggable" layer. It can be replaced by an arbitrary persistence mechanism. The upper layer, otherwise referred to as the store layer 106, provides a standardized asynchronous API to the programs that use the store. The contract 107 between the lower and upper layers is provided via an "interface" definition, which in one embodiment is named "StoreIOStream". In the context of a Java-based implementation the lower layer 108 honors this contract by creating a Java class that implements this interface. Other programming languages may implement the contract by different means. The contract is kept simple by keeping the interface simple and also by guaranteeing that the upper layer 106 will always invoke the lower layer 108 in a synchronous and predictable fashion (for example, one limitation may be that no two methods on the "StoreIOStream" interface may be called simultaneously). To further simplify the design of the lower layer, in one embodiment a test harness is provided. This test harness directly drives the lower layer, and allows for testing the pluggable layer without the complexity of testing it via a queuing system layered above.

The "pluggable store" uniquely defines a messaging or queuing layer or queuing system's 104 interaction with its persistent store in a simple, scalable fashion. In addition it uniquely provides the ability to plug-in new persistence mechanisms that can be tested and tuned independently of the queueing system. This allows servers that utilize an embodiment of the invention to easily support persistence to, for example, both a file system 110 and a database 112. It also allows messaging servers, for example those based on WebLogic JMS, to easily add new persistence mechanisms should the need arise.

In accordance with an embodiment of the invention, the pluggable layer ("StoreIOStream") provides a simple interface API some functions of which are shown in FIG. 3. An instance of the StoreIOStream interface is shown below. As can be seen from FIG. 3 and the API interface listing, the API provides functions or routines to manipulate the records in the store, including but not limited to, opening the store 204, recovery of the store 206, writing an object to the store 208, changing the state of an object within the store 210, deleting an object 212, flushing the store 214, closing the store 216, and throwing exceptions 218 to the store.

```
#interface implemented by pluggable layer.
/**
 * StoreIOStream <p>
 *
 * This interface defines a persistent store plug-in for
 * the storage manager. It defines the layer at which
 * file IO or database IO is implemented.
 * @author Copyright (c) 2000 by BEA, Inc., All Rights Reserved.
 *
 */
public interface StoreIOStream {
  // reserve 8-15 for internal use
  static final int MAXSTATE = 7;
  static final int MINSTATE = 0;
  static final int STATEMASK = 7;
  /**
   * Open the store. The next method called will be recover( )
   * or close( ). If this method throws an IOException, the
   * server will not boot.
   * @param serverName The name of the JMS server this store
   * is associated with. Used for log messages.
   * @throw IOException a fully informative exception on error
   */
  void open(String serverName) throws IOException;
  /**
   * Close the store.
   * @throw IOException a fully informative exception on error
   */
  void close( ) throws IOException;
  /**
   * Write an object to the store.
   * @param o       The object to store.
   * @param state   Initial state of the object. 0 <= state <= 7
   * @param correlator Arbitrary value, visible in database tables.
   *
   * @return handle to the stored object
   * @throw IOException a fully informative exception
   */
  long write(Externalizable o, int state, long correlator)
  throws IOException;
  /**
   * Change the state of a store object.
   * @param handle   Handle returned from write( ) or recover( ).
   * @param state    New state of the object. 0 <= state <= 7
   * @throw IOException a fully informative exception
   */
  void changeState(long handle, int state) throws IOException;
  /**
   * Delete a store object.
   * @param handle   Handle returned from write( ) or recover( ).
   * @throw IOException a fully informative exception
   */
  void delete(long handle) throws IOException;
  /**
   * Flush (commit) all pending writes, changes, and deletes.
   * @throw IOException a fully informative exception
   */
  void flush( ) throws IOException;
  /**
   * Read on object from the store.
   * @param handle Handle return from write( ) or recover( )
   * @throw IOException a fully informative exception
   */
  Externalizable read(long handle) throws IOException;
  /**
   * Return a linked list of all objects in the store, includes
   * their associated states and handles. This method will
   * only be called directly after a succesfull open( ), and
   * will only be called once. If this method throws an IOException,
   * the server will not boot.
```

-continued

```
 * @throw IOException a fully informative exception on error
 */
StoreEntry recover( ) throws IOException;
/**
 * Throw a "decorated" IOException that prepends
 * helpful information about the StoreIOStream to
 * the given String.
 */
void throwIOException(String s) throws IOException;
}
```

FIG. 4 illustrates how the various API's in one embodiment of the invention that may be used to manipulate the store and any entries contained therein. The StoreIOStream API 302 reduces queuing persistence down to basics. It takes advantage of the fact that it is possible for the queuing system to function efficiently without rewriting records. The API provides a facility for dynamically changing a record by changing its state. In accordance with one embodiment, the value of this state is limited to a number between 0 and 7, which the queuing system uses to persistently mark the state of a message in its system. A queuing system typically uses this state to reflect the transaction status of the message, (i.e., whether it is committed, in the process of a send, or in the process of a receive) and the failure status of the message, (i.e., whether it ever redelivered).

The upper "Store" API 304, an example of which is given below, is similar to the "StoreIOStream interface, but adds asynchronicity. This allows the queuing system to send a request to the store, but not have to wait for it to complete. Instead the store is contracted to tell the queuing system when the write completes. The simplicity of the store layer simplifies the design of the queueing system, as it provides a clean abstraction for asynchronous persistence that maps well to the needs of a queuing system.

```
# Portion of API for store layer, used directly by queueing system
/**
 * @author Copyright (c) 2001 by BEA Systems, Inc. All Rights
Reserved.
 */
final public class JMSStore
{
  /**
   * Call open before using this store.
   */
  public void open( )
  throws IOException
  /**
   * Call recover after a successful open but before using this
store.
   * @return A linked list of all stored objects.
   */
  public StoreEntry recover( )
  throws IOException
  /**
   * Write an externalizable object to the store asynchronously.
   * Call storeRequest.getStoreEntry( ) to get the entry to use for
   *subsequent read, change, or delete requests on this object.
   * @param initState Arbitrary number between 0 and 7.
   */
  public StoreRequest asyncWrite(Externalizable e,
                                 int initState,
                                 StoreListener optionalListener1,
                                 StoreListener optionalListener2)
  /**
   * Persistently change the state of the object.
   * @param newState Arbitrary number between 0 and 7.
   */
```

-continued

```
  public StoreRequest asyncChange(StoreEntry se,
                                  int newState,
                                  StoreListener optionalListener)
  /**
   * Delete the given stored object.
   */
  public StoreRequest asyncDelete(StoreEntry se,
                                  StoreListener optionalListener1,
                                  StoreListener optionalListener2)
  /**
   * Close the store. All subsequent store requests will fail with
   * a "closed" IOException until open( ) and recover( ) are
   * called again.
   */
  public StoreRequest asyncClose(StoreListener optionalListener)
  /**
   * EXPERT USE ONLY, storeEntry must be locked for this to work!
   * Check if an IO is pending for the given store entry. To be
   * useful, hold the store entry lock until done modifying
   * the underlying externalizable.
   */
  public StoreRequest getActiveIORequest (StoreEntry se, StoreListener
optionalListener) {
    if (se.storeRequest != null && optionalListener != null)
      se.storeRequest.addStoreListener(optionalListener);
    return se.storeRequest;
  }
}
```

The asynchronocity of the store layer in combination with the deferred flush capability of the pluggable layer has a significant performance benefit. This allows several write, delete, or change requests to be processed concurrently, which in turn allows their aggregation. Aggregating the requests allows the pluggable layer to combine multiple operations into one operation and therefore perform the requests faster. The performance benefit here is scalability. It aids the queuing system in handling multiple simultaneous requests without a linear slowdown in performance.

The restriction of not allowing records to be changed except via their state also aids performance. This allows the store layers to optimize their algorithms such that there is smaller overhead for changing record state.

Other API's used by the an embodiment of the invention are shown in FIG. 4. These include the Store Listener API 310, for callback completion of an I/O for a given store entry.

```
#A portion of API for store layer, used directly by queueing system.
/**
 * StoreListener <p>
 *
 * @author Copyright (c) 2000 by BEA, Inc., All Rights Reserved.
 */
public interface StoreListener {
  /**
   * Callback for completion of an IO for the given store entry.
   * A NotActiveException if store is closed.
   * Any other IOException indicates some other I/O failure.
   * In the case of a close, the given store entry is a dummy
   * entry.
   * @see weblogic.jms.store.JMSStore#asyncWrite
   * @see weblogic.jms.store.JMSStore#asyncChange
   * @see weblogic.jms.store.JMSStore#asyncDelete
   * @see weblogic.jms.store.JMSStore#asyncClose
   */
  public void storeIOComplete(StoreEntry se, IOException ioe);
}
```

The Store Request API 306 represents an I/O request. The request is first queued and fed to an I/O thread. The I/O thread executes the request and then schedules the request with a thread pool to report the result to the associated listener.

```
# Portion of API for store layer, used directly by queueing system.
/**
 * StoreRequest <p>
 *
 * An opaque class visible outside the package that represents
 * an I/O request. A request is first queued up and fed
 * into an I/O thread, the I/O thread executes the request
 * and then schedules the request with a thread
 * pool to report the result to the assocated StoreListener.
 * (The thread pool executes the StoreListener callback). <p>
 *
 * @author Copyright (c) 2000 by BEA, Inc., All Rights Reserved.
 */
final public class StoreRequest
implements ExecuteRequest
{
  /**
   * Get the StoreEntry associated with this request.
   */
  public StoreEntry getStoreEntry( )
  /**
   * Wait for this request to finish.
   * @throws NotActiveException if store is closed.
   * @throws IOException on any other I/O failure.
   */
  synchronized public void waitForIOComplete( )
  throws IOException
}
```

The StoreEntry API 308 is used to indicate an object stored in the store and include its state.

```
#A portion of API for store layer, used directly by queuing system.
/**
 * StoreEntry <p>
 *
 * An object stored in the store. This includes its
 * state, and an optional 'hidden' stored object.
 * The state range MUST be limited to 0 to 7 inclusive.
 *
 * @author Copyright (c) 2000 by BEA, Inc., All Rights Reserved.
 */
final public class StoreEntry {
  synchronized public final int getState( )
  public final Object getObject( )
  /**
   * @param re set next element to re
   */
  public final void setNext(StoreEntry re)
  /**
   * @return next element, null if none
   */
  public final StoreEntry getNext( )
}
```

Figure 5:
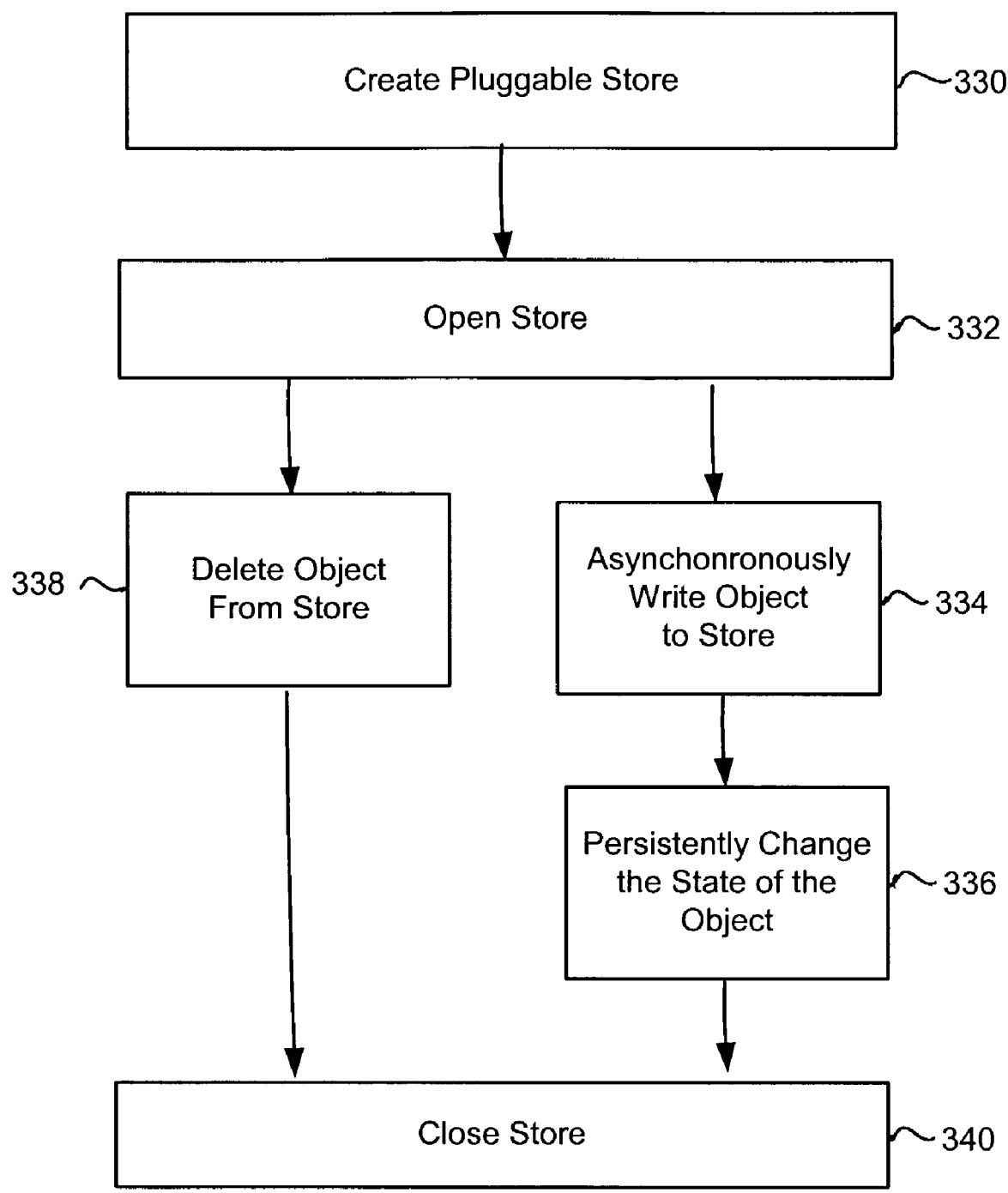
FIG. 5 illustrates a method of using the pluggable store in accordance with an embodiment of the invention.

FIG. 5 illustrates a flow chart showing how an embodiment of the invention can be used to write or delete objects from a resource via the pluggable store. As shown in FIG. 5, a pluggable store must first be created in step 330. This can be done during system back-up. When the messaging system wishes to write to, or delete an object from, a resource, such as a database, a call is made via the API to open the store, in step 332. The messaging system can then asynchronously write the object to the store, in step 334. The objects' state is changed to persistently write the object to the resource, in step 336. In step 340, the store is then closed. If the object is to be deleted this can be sone by deleting the object from the open store, in step 338.

INDUSTRIAL APPLICABILITY

In summary, the features and benefits of the pluggable store design as provided by an embodiment of the disclosed invention include:

Pluggable nature with regard to persistent resources
Asynchronous operation
Simple to implement
State changes can be limited to a small integer
Easy-to-upgrade by plugging in a new design.
Enhanced performance and scalability.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. Particularly, while the implementation described herein focuses primarily on Java-based systems and the JMS server, it will evident that the pluggable store provided by the invention can be used with other programming languages and with other messaging or queuing servers and systems. The embodiments were chosen and described in order to best explain the principles of the invention and its practical application, thereby enabling others skilled in the art to understand the invention as it may be used in various embodiments and with various modifications that are suited to the particular use contemplated. It is intended that the scope of the invention be defined by the following claims and their equivalence.

What is claimed:

1. A computer-based system that uses a pluggable store to communicate between a messaging server and a plurality of persistent resources, comprising:

a messaging server that sends, via an application program interface that includes asynchronous persistence capability, asynchronous messages to a pluggable store to update the contents of a persistent resource;

a pluggable store that provides the application program interface used by the messaging server to send the asynchronous messages to the pluggable store and provides an interface definition between said asynchronous messages and a plurality of persistence mechanisms plugged into the pluggable store, wherein each of the plurality of persistence mechanisms is associated with a persistent resource and implements the interface definition between said asynchronous messages and the plurality of persistence mechanisms to plug an associated persistent resource into the pluggable store; and a plurality of persistent resources embodied on computer readable storage media, the contents of which are persistently updated by the pluggable store in response to receiving said asynchronous messages;

wherein the interface definition defines functions to open, close, write to, and delete an object from an associated persistent store;

wherein the application program interface provides functions that the messaging server accesses to manipulate records in the plurality of persistent resources including functions to open the plurality of persistent resources, functions to write an object to the plurality of persistent resources, functions to delete an object in the plurality of persistent resources, and functions to close the plurality of persistent resources;

wherein the pluggable store allows several write, delete, or change requests to be aggregated and processed concurrently;

wherein the messaging server is a JAVA Messaging Service (JMS) layer; and wherein the asynchronous persistence capability is part of an asynchronous store layer wherein the pluggable store is part of a synchronous pluggable layer wherein the interface definition defines the interaction of the asynchronous persistent store and the synchronous pluggable layer.

2. The system of claim 1 wherein the pluggable store provides a deferred flush capability.

3. The system of claim 1 wherein records in the plurality of persistent resources are only changed via their state.

4. A pluggable store for allowing communication between a messaging server and a persistent resource embodied on computer readable storage media, comprising:

a message store layer including an asynchronous persistence application program interface that includes asynchronous persistence capability, that allows access to the pluggable store from the messaging server via the asynchronous persistence application program interface;

a pluggable layer, that allows the plugging in of different persistence mechanisms, each persistence mechanism corresponding to a persistent resource; and an interface definition between the message store layer and the pluggable layer, that insures the message store layer will always synchronously invoke the pluggable layer, wherein each of the different persistence mechanisms implement the interface definition to plug an associated persistent resource into the pluggable store;

wherein the interface definition defines functions to open, close, write to, and delete an object from an associated persistent store;

wherein objects can be written to the resource by sending messages from the messaging server to the message store layer;

wherein the asynchronous persistence application program interface provides functions that the messaging server accesses to manipulate records in the persistent resource including functions to open the persistent resource, functions to write an object to the persistent resource, functions to delete an object in the persistent resource, and functions to close the persistent resource; and wherein the pluggable layer allows several write, delete, or change requests to be aggregated and processed concurrently;

wherein the messaging server is a JAVA Messaging Service (JMS) layer; and wherein the asynchronous persistence capability is part of an asynchronous store layer wherein the pluggable store is part of a synchronous pluggable layer wherein the interface definition defines the interaction of the asynchronous persistent store and the synchronous pluggable layer.

5. The pluggable store of claim 4 wherein the pluggable layer includes a deferred flush capability.

6. The pluggable store of claim 4 wherein records in the persistent resource are only changed via their state.

7. A computer-based method for communicating messages, comprising the steps of:

sending, via an application program interface that includes asynchronous persistence capability, asynchronous messages from a messaging server to a pluggable store to update the contents of a persistent resource embodied on computer readable storage media;

providing a pluggable store that includes the application program interface that allows the messaging server to send the asynchronous messages to the pluggable store and an interface definition between said asynchronous messages and a pluggable layer including a plurality of persistence mechanisms plugged into the pluggable store, each of which is associated with a persistent resource and implements the interface definition between said asynchronous messages and the plurality of persistence mechanisms to plug an associated persistent resource into the pluggable store; and, persistently updated the contents of any of a plurality of persistent resources in response to receiving said asynchronous messages;

wherein the interface definition defines functions to open, close, write to, and delete an object from an associated persistent store;

wherein the application program interface provides functions that the messaging server accesses to manipulate records in the plurality of persistent resources including functions to open the plurality of persistent resources, functions to write an object to the plurality of persistent resources, functions to delete an object in the plurality of persistent resources, and functions to close the plurality of persistent resources; and wherein the pluggable layer allows several write, delete, or change requests to be aggregated and processed concurrently;

wherein the messaging server is a JAVA Messaging Service (JMS) layer; and wherein the asynchronous persistence capability is part of an asynchronous store layer wherein the pluggable store is part of a synchronous pluggable layer wherein the interface definition defines the interaction of the asynchronous persistent store and the synchronous pluggable layer.

8. The method of claim 7 wherein the pluggable layer includes a deferred flush capability.

9. The method of claim 7 wherein records in the plurality of persistent resources are only changed via their state.

10. A method for writing queued data to a persistence mechanism, comprising the steps of:

receiving, via an asynchronous persistent application program interface, messages at a message store layer from a messaging server, wherein the message store layer allows access to the pluggable store from the messaging server;

passing the messages via an interface definition to a pluggable layer that allows the plugging in of different persistence mechanisms, wherein each persistence mechanism corresponds to a persistent resource and implements the interface definition; and updating objects in the persistent resources in response to receiving said messages;

wherein the interface definition defines functions to open, close, write to, and delete an object from an associated persistent store;

wherein the asynchronous persistent application program interface provides functions that the messaging server accesses to manipulate records in the persistent resource including functions to open the persistent resource, functions to write an object to the persistent resource, functions to delete an object in the persistent resource, and functions to close the persistent resource; and wherein the pluggable layer allows several write, delete, or change requests to be aggregated and processed concurrently;

wherein the messaging server is a JAVA Messaging Service (JMS) layer; and wherein the asynchronous persistence capability is part of an asynchronous store layer wherein the pluggable store is part of a synchronous pluggable layer wherein the interface definition defines the interaction of the asynchronous persistent store and the synchronous pluggable layer.

11. The method of claim 10 wherein the pluggable layer includes a deferred flush capability.

12. The method of claim 10 wherein records in the persistent resource are only changed via their state.

* * * * *

UNITED STATES PATENT AND TRADEMARK OFFICE
CERTIFICATE OF CORRECTION

PATENT NO. : 7,631,092 B2 Page 1 of 1
APPLICATION NO. : 10/264701
DATED : December 8, 2009
INVENTOR(S) : Thomas E. Barnes It is certified that error appears in the above-identified patent and that said Letters Patent is hereby corrected as shown below:

On the title page, item (*) Notice should read:

Subject to any disclaimer, the term of this patent is extended or adjusted under 35 U.S.C. 154(b) by 1294 days.

On the title page, in field (73), in column 1, in "Assignee", line 1, delete "Redwoof Shores," and insert -- Redwood Shores, --, therefor.

In column 6, line 28, delete "asynchronocity" and insert -- asynchronicity --, therefor.

In column 6, line 44, after "by" delete "the".

In column 8, line 2, delete "sone" and insert -- done --, therefor.

Signed and Sealed this

Fourteenth Day of September, 2010

David J. Kappos
*Director of the United States Patent and Trademark Office*